Figure 1:
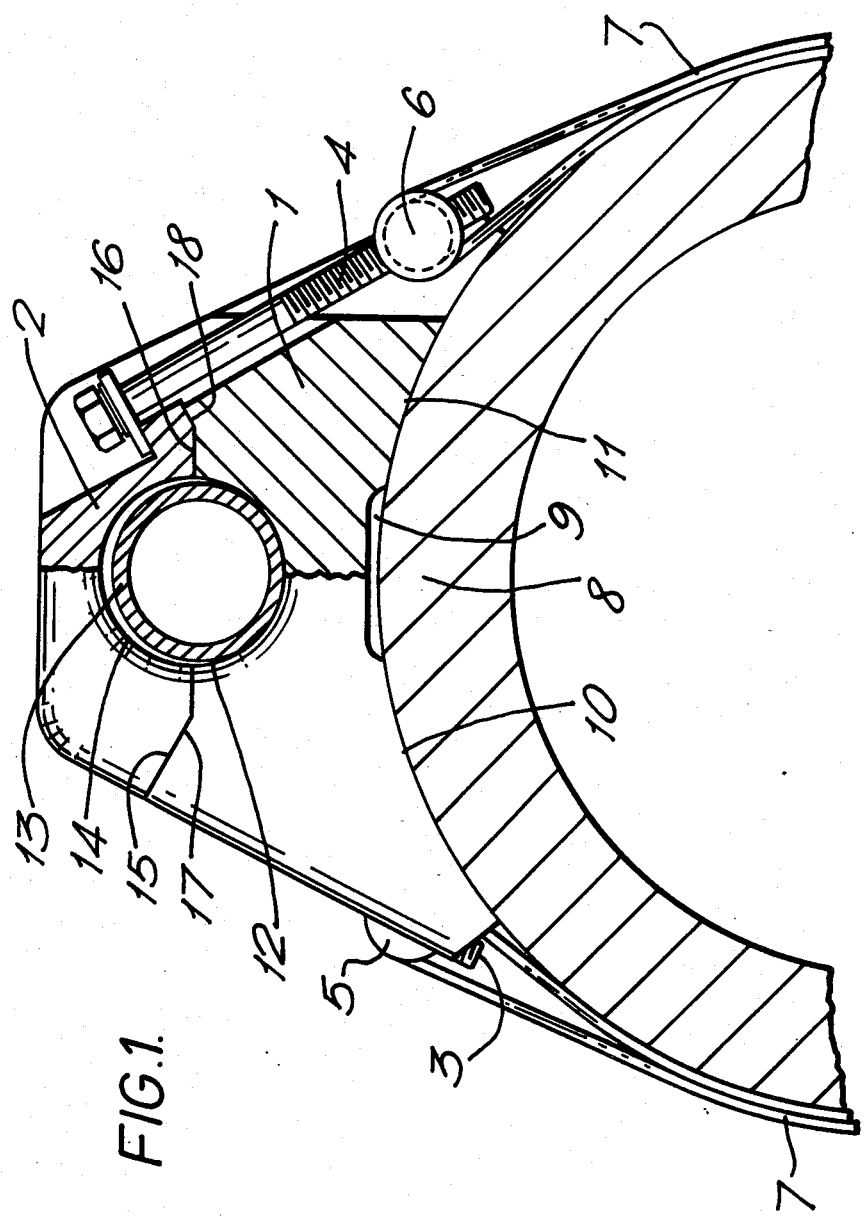

United States Patent [19]

Barnes et al.

[11] Patent Number: 4,678,147
[45] Date of Patent: Jul. 7, 1987

[54] CLAMPS FOR ATTACHING PIPELINES TOGETHER IN PARALLEL RELATIONSHIP

[75] Inventors: John R. Barnes, Surbiton; John E. Diamond, London; Graham J. Griffin, Binfield, all of United Kingdom

[73] Assignee: Conoco Inc., Ponca City, Okla.

[21] Appl. No.: 766,602

[22] Filed: Aug. 15, 1985

[30] Foreign Application Priority Data

Aug. 17, 1984 [GB] United Kingdom ............... 8421027

[51] Int. Cl.$^4$ .............................................. F16L 3/08
[52] U.S. Cl. ..................................... 248/74.1; 24/279; 24/335; 24/339; 248/68.1; 248/231; 248/74.3
[58] Field of Search .................... 248/74.1, 74.3, 74.4, 248/49, 65, 68.1, 69, DIG. 1, 231, 231.1; 24/339, 335, 20 LS, 279, 284, 19; 285/137 R

[56] References Cited

U.S. PATENT DOCUMENTS

| | | | |
|---|---|---|---|
| 1,646,423 | 10/1927 | Schaub | 248/49 |
| 2,107,037 | 2/1938 | Kippenberg et al. | 248/231 |
| 2,497,820 | 2/1950 | Kielland | 24/335 X |
| 2,530,179 | 11/1950 | Rosen | 248/74.1 |
| 2,936,186 | 5/1960 | Dunmire | 24/279 X |
| 3,226,069 | 12/1965 | Clarke | 248/68.1 X |
| 3,396,440 | 8/1968 | Van Schendelen | |
| 3,434,682 | 3/1969 | Nestlerode | 248/68.1 |
| 4,059,872 | 11/1977 | Delesandri | 24/279 X |
| 4,249,716 | 2/1981 | Barron | 248/231 X |
| 4,428,104 | 1/1984 | Smith | 24/279 |
| 4,514,103 | 4/1985 | Wise et al. | 248/74.1 |

*Primary Examiner*—Ramon O. Ramirez
*Attorney, Agent, or Firm*—A. Joe Reinert

[57] ABSTRACT

A line (such as a pipeline) of smaller diameter is mounted on a line of larger diameter with a clamp comprising a saddle for positioning on the larger line, a channel formed in the outer face of the saddle for receiving the smaller line, a closure member mountable on the saddle to close the channel around the smaller line, a strap for passing around the larger line, and at least two tensioning devices for tensioning the respective ends of the strap to the sides of the closure member. The clamp is particularly useful for connecting subsea pipelines.

12 Claims, 6 Drawing Figures

CLAMPS FOR ATTACHING PIPELINES TOGETHER IN PARALLEL RELATIONSHIP

This invention relates to clamps for attaching pipelines together in parallel relationship and is particularly concerned with such clamps for use in attaching a pipeline of smaller diameter on to a pipeline of larger diameter.

It is known for example in the use of underwater pipelines to utilise an arrangement in which a pipeline of smaller diameter is attached to a pipeline of larger diameter. One instance of this is in the North Sea in which it is known to inject methanol into a North Sea gas stream to suppress hydrate formation and to reduce corrosion, and in order to provide a supply of methanol for this purpose epoxy resin-coated methanol pipelines which have a diameter of about 90 mm are attached to concrete-coated gas pipelines which have a diameter of about 544 mm. The methanol and gas pipelines have been strapped together prior to laying using stainless steel bander straps and the heavier gas pipeline provides support for the lighter methanol pipeline. This method has however proved to be troublesome in operation with the bander straps breaking as a result of corrosion and/or excessive forces being applied and the methanol pipelines in consequence losing the stability provided by their attachment to the gas pipelines. In such circumstances the methanol pipeline has a tendency to spiral around the gas pipeline thereby increasing the difficulties of maintenance and may also stray from the seabed with the risk of rupture e.g. by contact with fishing vessel trawler boards.

It is an object of the present invention to provide a clamp for attaching together pipelines of different diameters in parallel relationship which is suitable for use for example in attaching together the above-mentioned methanol and gas pipelines.

The present invention thus provides a clamp for use in attaching a pipeline of smaller diameter to a pipeline of larger diameter which comprises a saddle for positioning on the pipeline of larger diameter, a channel formed in the upper face of the saddle in which in use the pipeline of smaller diameter can be positioned, a closure member mountable on the saddle to close the channel around the pipeline of smaller diameter and two tensioning members for attachment to the ends of a strap passing around the pipeline of larger diameter and engagement with opposite sides of the closure member whereby in use the closure member is pressed on to the saddle as the strap is tensioned.

The saddle is desirably made of a deformable polymeric material which grips well on the surface of the pipe of larger diameter. In the case of concrete coated pipelines it has been found that polyamide polymers e.g. a nylon such as nylon 6, have the desired properties, the surface of a saddle made of such materials being sufficiently deformable to grip strongly on the irregular concrete surface of the pipe. The grip of the saddle on the pipe can generally be strengthened by providing a recess on the underside of the saddle thereby defining deformable feet on either side of the recess which are in contact with the pipe and which upon tensioning the strap are pressed against the pipe surface.

The channel formed on the upper face of the saddle is conveniently of semi-circular cross-section with the closure member having a corresponding channel of semi-circular cross-section which, upon correct positioning of the closure member, forms a closure channel of essentially circular cross-section. The mating surfaces of the saddle and the closure member are advantageously shaped so that the closure member is self-locating in the direction at right angles to that in which the pipelines extend whereby the closed channel of circular cross-section is quickly and easily provided upon placement of the closure cap on the saddle. The provision of a closed channel of greater diameter than the outer diameter of the pipeline passing therethrough allows freedom for sliding and expansion.

The tensioning members are conveniently bolts which are provided at their ends with means such as for example tee-bars for attachment to the strap and which are passed through bolt holes or slots on either side of the closure member and also preferably on either side of the saddle. The use of bolt slots into which the bolts can be laterally inserted is preferred as this avoids the need to thread the bolts through bolt holes and enables the bolts to be pre-attached to the strap. With a tensioning member on either side, tension can be evenly applied to both ends of the strap thereby avoiding a tendency for twisting of the clamp around the pipeline of larger diameter as the tension is applied.

The strap must be sufficiently strong to resist the loading forces applied on fixing. The strap must also be durable in the environment in which it is to be used. For underwater use for example on concrete gas pipelines as described above, it has been found that straps made of yarns of aramid fibres (e.g. Kevlar 49 yarn, the word 'Kevlar' being a registered Trade Mark) embedded in a durable polymeric sheath (e.g. a polyethylene or polyester elastomeric polymer such as Hytrel, the word 'Hytrel' being a registered Trade Mark) are suitable, one such material which can conveniently be used being that available from Linear Composites Limited of Harrogate, North Yorkshire, England under the registered Trade Mark 'Paraweb'. The strap preferably is contnuous and is formed of a sufficient number of layers of material to provide adequate strength. The strap is conveniently formed into loops for attachment to the tensioning members and, when as is preferred the attachment to the tensioning members is by means of tee-bars, double loops can be formed by the provision of slots in the looped portions of the strap.

Figure 2:
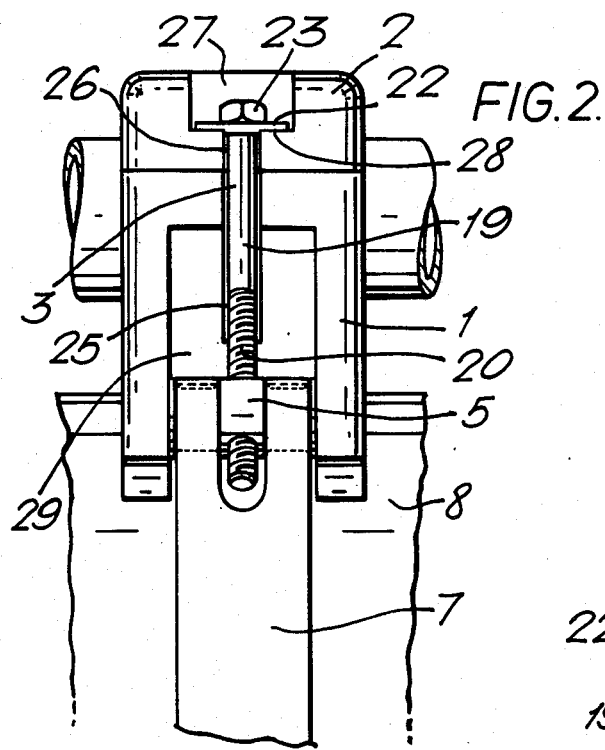
Figure 3:
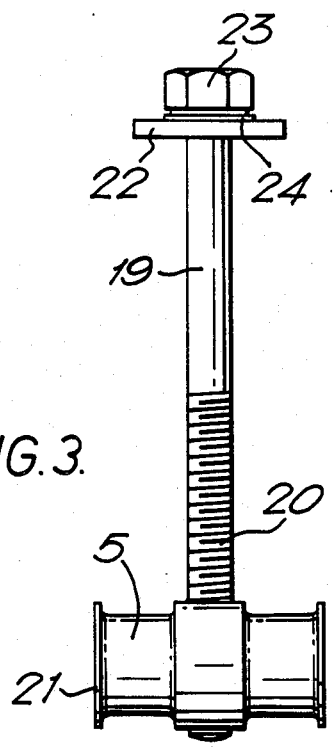
Figure 4:
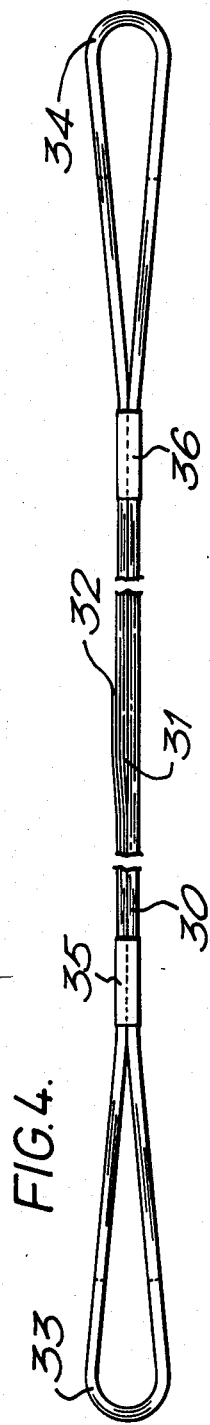
Figure 5:
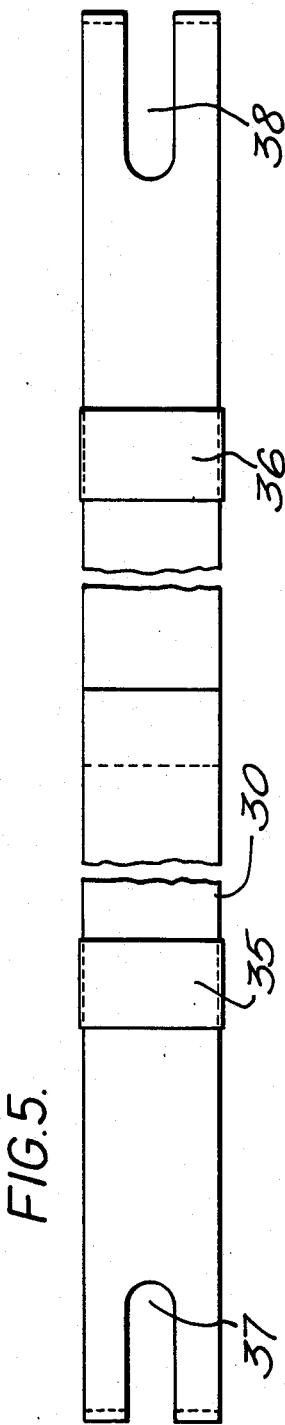
Figure 6:
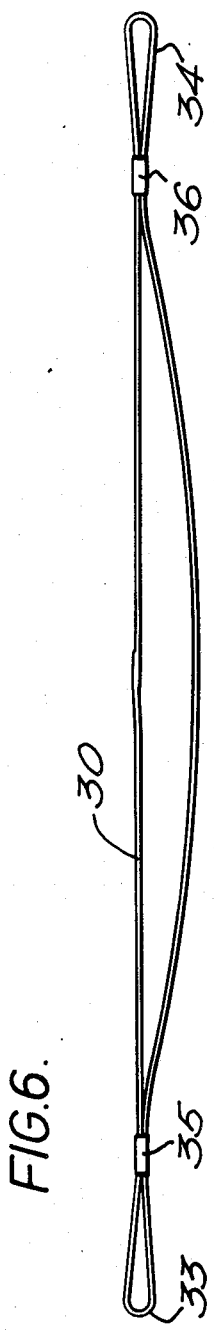

The invention will now be further described by reference to a particular embodiment thereof as illustrated in the accompanying drawings, in which:

FIG. 1 shows an elevation, partly in section, of a clamp according to the invention in use to attach a concrete gas pipeline to an epoxy coated mechanol pipeline of smaller diameter, FIG. 2 shows a side elevation of the arrangement of FIG. 1, FIG. 3 is a plan view of the tensioning device used in strapping the clamp to the pipe of larger diameter, FIG. 4 is a side view of the strap, FIG. 5 is a plan view of the strap, and FIG. 6 is a side view of the strap to a smaller scale than FIG. 4 which shows its configuration prior to placement around the gas pipe.

Referring first to FIG. 1, the clamp consists of a nylon saddle 1, a nylon closure cap 2 and tensioning devices comprising corrosion-resistant metal bolts 3 and 4 provided with tee-bars 5 and 6 respectively which are connected to the ends of a strap 7.

The saddle 1 is strapped to a concrete-coated gas pipeline 8 and is provided on its underside with a central recess 9 which extends along the length of the saddle. The arcuate feet 10 and 11 of the saddle on either side of the central recess 9 serve to grip the concrete pipe 8 and to resist any tendency for the saddle to slip along or around the pipe. The upper face of the saddle 1 is provided with a central channel 12 of semi-circular cross-section in which an epoxy resin-coated methanol pipe 13 is seated.

The closure cap 2 is provided with a channel 14 of semi-circular cross-section which together with channel 12 in the saddle forms a closed channel of circular cross-section. The diameter of the closed channel is greater than the outer diameter of the methanol pipe 13 within it thereby allowing freedom for sliding and expansion of the pipe 13. The mating surfaces 15 and 16 of the closure cap and 17 and 18 of the saddle are inwardly inclined so that the closure cap is self-locating in the direction at right angles to the pipeline.

FIG. 2 shows one of the tensioning devices, consisting of a bolt 3 provided with a tee-bar 5, in position in the clamp and FIG. 3 is a plan view which shows the tensioning device in more detail. It consists of bolt 19 with a threaded portion 20 extending through the tee-bar 5 which is provided with a flange 21 for location of the strap on the tee-bar. It is used in conjunction with a pressure plate 22 which is separated from the bolthead 23 by a washer 24.

For ease of assembly, the saddle 1 and closure cap 2 are provided with bolt slots 25 and 26 respectively. Access to the bolthead is provided by a recess 27 in the closure cap and the pressure plate 22 rests on the ledge 28 at the bottom of recess 27 and serves to locate the bolt in position so that it is spaced from the walls of the slots while being within the profile of the clamp. The insertion of the bolts after pre-attachment of the strap also serves to locate the closure cap in the direction parallel to the pipelines, the closure cap as previously described being self-locating in the direction at right angles to the pipelines. The tee-bar 5 is situated within a recess 29 in saddle 1 and is free to move upwards in the recess 29 as the bolt is turned to apply tension to the strap 7. Concrete pipes may be of variable diameter and the recess 29 is of sufficient length to allow for the necessary variations in the final positioning of the tee-bar 5 following tensioning of the strap.

The strap 7 is shown in more detail in FIGS. 4 to 6. It is made from a web consisting of parallel lengths of Kevlar 49 core yarn embedded in a Hytrel polymeric sheath, such a web being supplied under the registered Trade Mark 'Paraweb' by Linear Composites Limited. A continuous band 30 of three layers of the Paraweb material is formed by winding the web around itself and bonding the ends 31 and 32 with a suitable adhesive. Loops for attachment to the tee-bars are then formed by binding with Hytrel tape 35 and 36. The portions of the strap between tapes 35 and 36 are of different lengths to allow for the extra length required for the outer portion of the strap upon bending around the concrete pipe. At each end a double loop for fitting over the tee-bars is formed by the provision in the web of slots 37 and 38 which are spaced equally about the apex of each loop. Straps made from webs of Kevlar yarn embedded in Hytrel polymeric material have an advantage in that they have an elastic memory. This assists in retaining the clamp in the desired positions after fixing.

In use, the provision of two tensioning devices situated either side of the assembled clamp means that any tendency for twisting to occur as the clamp is tightened can be avoided. The location of the pipeline of smaller diameter within a closed channel of larger diameter allows freedom for sliding and expansion of the pipe of smaller diameter. The utilisation of a saddle arrangement provides a small gap between the two pipelines which allows space for deflection of the pipeline of smaller diameter between successive clamps and for the possible installation of equipment such as anodes, field joint moulds, etc. between methanol and gas pipelines while not being sufficiently large to cause a risk of snagging by fishing vessel trawler boards. The preferred features of using a deformable polymeric material such as nylon for the manufacture of the saddle and providing a central recess on the underside of the saddle results in the saddle having a strong grip on concrete pipes so that it maintains its position and does not tend to slide along or around the pipe. The preferred features of using materials such as nylon 6 for the saddle and closure cap, a corrosion-resistant metal such as Monel K 500 for the tensioning devices and Kevlar yarn embedded in a Hytrel polymer sheath for the strap provides a clamp with sufficient resistance to the loading forces applied on fixing, sufficient strength to withstand pipe-trenching and sufficient durability in underwater conditions to provide a long life expectancy. Other advantages, as will be apparent from the preferred embodiment as described above with reference to the accompanying drawings, are that the clamps according to the invention can be produced in a form which is quick and easy to install, this being important because the clamping takes place in the course of pipelaying and the fixing of the clamps should not slow down the pipe laying operation, and that the clamps can be produced with a clean profile thereby reducing to a minimum the risk of snagging by fishing nets and the like. A still further advantage as compared with the previous practice of strapping the epoxy coated methanol pipeline to the gas pipeline is that the clamps, which in use are desirably regularly spaced at for example about 6 metre intervals, serve as protectors to reduce the risk of the more fragile epoxy coated methanol pipeline coming into direct contact with shipping vessel trawler boards likely to cause damage thereto.

We claim:

1. A clamp for use in mounting a line of smaller diameter on a line of larger diameter which comprises a saddle for positioning on the line of larger diameter, a channel formed in an outer face of the saddle for receiving the line of smaller diameter, a closure member mountable on the saddle to close the channel around the line of smaller diameter, a strap for passing around the line of larger diameter, connectable to opposite sides of the closure member and at least two tensioning devices connectable between the respective ends of the strap and the opposite side of the closure member and tensionable around the line of larger diameter whereby in use the saddle is pressed against the line of larger diameter and the closure member is pressed against the saddle as the tensioning devices are tensioned, wherein the tensioning devices are bolts which are provided at their ends with tee-bars for attachment to the strap and which in use pass through bolt holes or slots on either side of the closure member.

2. A clamp according to claim 1 wherein the lines of smaller and larger diameters are both pipelines.

3. A clamp according to claim 1 wherein the closure member and the saddle are provided with slots within which in use the bolts can be positioned after pre-attachment to the strap.

4. A clamp according to claim 1 wherein the tensioning devices are made of corrosion-resistant metal.

5. A clamp according to claim 1 wherein the saddle is made of polymeric material.

6. A clamp according to claim 5 wherein the saddle is made of a nylon material.

7. A clamp according to claim 6 wherein the saddle is made of nylon 6.

8. A clamp according to claim 1 wherein a recess is provided on the underside of the saddle thereby defining feet on either side of the recess which in use are in contact with the line of larger diameter and which upon tensioning the strap are pressed against the line of larger diameter.

9. A clamp according to claim 1 wherein the mating surfaces of the saddle and the closure member are inwardly inclined so that the closure member is self-locating in the direction at right angles to that in which the lines extend.

10. A method of mounting a line of smaller diameter on a line of larger diameter using a clamp as claimed in claim 1 which comprises:
    (a) Positioning the saddle of the clamp on the line of larger diameter;
    (b) positioning the line of smaller diameter in the channel provided in an outer face of the saddle;
    (c) positioning the closure member so as to close the channel around the line of smaller diameter; add
    (d) tensioning the holding means whereby the saddle is pressed against the line of larger diameter and the closure member is pressed against the saddle.

11. A method as claimed in claim 10 wherein the lines of smaller and larger diameters are both pipelines.

12. A clamp according to claim 1 wherein the closure member and the saddle are provided with slots wherein which in use the bolts can be positioned after pre-attachment to the strap.

* * * * *